(12) United States Patent
Miller et al.

(10) Patent No.: US 9,116,712 B2
(45) Date of Patent: Aug. 25, 2015

(54) COMPILE BASED OBFUSCATION

(71) Applicant: Microsoft Corporation, Redmond, WA (US)

(72) Inventors: Olaf Alexander Miller, Bellevue, WA (US); Ten Tzen, Sammamish, WA (US); Hakki T. Bostanci, Redmond, WA (US); Michael T. Pashniak, Newcastle, WA (US); Kalpesh S. Patel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/781,691

(22) Filed: Feb. 28, 2013

(65) Prior Publication Data

US 2014/0245271 A1    Aug. 28, 2014

(51) Int. Cl.
*G06F 9/45* (2006.01)
*G06F 21/14* (2013.01)

(52) U.S. Cl.
CPC ........ *G06F 8/41* (2013.01); *G06F 8/423* (2013.01); *G06F 21/14* (2013.01); *G06F 8/47* (2013.01); *G06F 8/51* (2013.01); *G06F 8/52* (2013.01)

(58) Field of Classification Search
CPC .............. G06F 8/71; G06F 8/20; G06F 8/51; G06F 8/52; G06F 8/443; G06F 8/445; G06F 8/47; G06F 8/4442; G06F 9/45516
See application file for complete search history.

(56) References Cited

U.S. PATENT DOCUMENTS

| | | | |
|---|---|---|---|
| 6,668,325 B1 | 12/2003 | Collberg et al. | |
| 7,051,200 B1* | 5/2006 | Manferdelli et al. | 717/162 |
| 8,108,689 B2 | 1/2012 | Nicolson et al. | |
| 8,626,848 B2* | 1/2014 | Cohen et al. | 709/206 |
| 2007/0174818 A1* | 7/2007 | Pasula | 717/136 |
| 2008/0115119 A1* | 5/2008 | Lagergren | 717/148 |
| 2008/0201453 A1* | 8/2008 | Assenmacher | 709/219 |
| 2008/0215891 A1 | 9/2008 | Horne et al. | |
| 2008/0229115 A1* | 9/2008 | Wollnik et al. | 713/190 |
| 2008/0275829 A1* | 11/2008 | Stull et al. | 706/17 |

(Continued)

OTHER PUBLICATIONS

Jan Cappaert, "Code Obfuscation Techniques for Software Protection", Katholieke Universiteit Leuven, Apr. 2012, pp. 1-112; <https://www.cosic.esat.kuleuven.be/publications/thesis-199.pdf>.*

(Continued)

*Primary Examiner* — Thuy Dao
*Assistant Examiner* — Ben C Wang
(74) *Attorney, Agent, or Firm* — Brian Haslam; Mike Allan; Micky Minhas

(57) ABSTRACT

Compiler based obfuscation is described. To protect portions of a code project with obfuscations, the code is modified within a compiler to produce one or more modifications that obfuscate the code as part of a compilation process. A compiled version of the code is generated having the modifications that are produced within the compiler. In one approach, the compiler is configured to consume an obfuscation description that indicates portions of the code to protect and specifies the modifications to make to the indicated portions. Various different modifications of code may be performed during the compilation process to implement corresponding obfuscation features. For example, the modifications made within a compiler may include, but are not limited to, modifications designed to enable tamper detection, anti-debugging, and/or encryption of the code.

16 Claims, 6 Drawing Sheets

(56) References Cited

U.S. PATENT DOCUMENTS

| | | | |
|---|---|---|---|
| 2008/0288921 A1* | 11/2008 | Jacob et al. | 717/120 |
| 2009/0119515 A1* | 5/2009 | Nicolson et al. | 713/190 |
| 2009/0138863 A1* | 5/2009 | Lu et al. | 717/159 |
| 2009/0271771 A1* | 10/2009 | Fallows | 717/137 |
| 2010/0054459 A1* | 3/2010 | Ciet et al. | 380/28 |
| 2010/0058303 A1* | 3/2010 | Myles et al. | 717/159 |
| 2010/0180346 A1* | 7/2010 | Nicolson et al. | 726/26 |
| 2010/0235819 A1* | 9/2010 | Rose | 717/139 |
| 2010/0281459 A1* | 11/2010 | Betouin et al. | 717/106 |
| 2011/0066999 A1* | 3/2011 | Rabinovich et al. | 717/178 |
| 2011/0116624 A1* | 5/2011 | Farrugia et al. | 717/140 |
| 2011/0166974 A1* | 7/2011 | Cohen et al. | 705/34 |
| 2011/0173440 A1* | 7/2011 | Cohen et al. | 713/153 |
| 2011/0246787 A1* | 10/2011 | Farrugia et al. | 713/189 |
| 2012/0072992 A1* | 3/2012 | Arasaratnam et al. | 726/26 |
| 2012/0284688 A1 | 11/2012 | McLachlan et al. | |
| 2013/0014267 A1* | 1/2013 | Farrugia et al. | 726/26 |
| 2013/0036473 A1* | 2/2013 | Myles et al. | 717/140 |
| 2014/0006017 A1* | 1/2014 | Sen | 704/208 |
| 2014/0096194 A1* | 4/2014 | Bhogavilli et al. | 726/3 |
| 2014/0098132 A1* | 4/2014 | Fein et al. | 345/633 |
| 2014/0165208 A1* | 6/2014 | Chevallier-Mames et al. | 726/26 |

OTHER PUBLICATIONS

Ghosh et al., "Replacement Attacks Against VM-protected Applications", 2012 ACM, VEE'12, Mar. 3, 2012, pp. 203-214; <http://dl.acm.org/results.cfm?h=1&cfid=653252866&cftoken=75094448>.*

Vrba et al., "Program obfuscation by strong cryptography", 2010 IEEE, Feb. 15, 2010, pp. 242-247; <http://ieeexplore.ieee.org/stamp/stamp.jsp?tp=&arnumber=5438087>.*

Ertaul, et al., "JHide—A Tool Kit for Code Obfuscation", Retrieved at <<http://www.mcs.csueastbay.edu/~lertaul/436-035.pdf>>, In Proceedings of the Eighth IASTED International Conference, Nov. 9, 2004, pp. 6.

Madou, et al., "On the Effectiveness of Source Code Transformations for Binary Obfuscation", Retrieved at <<https://biblio.ugent.be/input/download?func=downloadFile&recordOld=374659&fileOld=496495>>, In Proceedings of the International Conference on Software Engineering Research and Practice & Conference on Programming Languages and Compilers, Jun. 26, 2006, pp. 7.

"Software Protection Service", Retrieved at <<http://morpher.com/>>, Retrieved Date : Feb. 4, 2013, pp. 2.

Neves, et al., "Binary Code Obfuscation through C++ Template Metaprogramming", Retrieved at <<http://inforum.org.pt/INForum2012/docs/20120025.pdf/at_download/file>>, In Proceedings of INForum, Sep. 2012, pp. 12.

"International Search Report and Written Opinion", Application No. PCT/US2014/018458, Jun. 18, 2014, 14 Pages.

"Second Written Opinion", U.S. Appl. No. PCT/US2014/018458, Feb. 04, 2015, 13 Pages.

"ProGuard", Retrieved from <https://web.archive.org/web/20120623235237/http:/developer.android.com/tools/help/proguard.html> on Mar. 20, 2015, Jun. 23, 2012, 3 pages.

Schulz, "Code Protection in Android", Institute of Computer Science, Germany, Jun. 7, 2012, 25 pages.

"International Preliminary Report on Patentability", U.S. Appl. No. PCT/US2014/018458, Jun. 12, 2015, 14 pages.

* cited by examiner

COMPILE BASED OBFUSCATION

BACKGROUND

One challenge associated with developing applications and other code is protecting sensitive portions of the code from being modified, disabled, or reverse engineered. For example, protection of code portions designed to implement electronic licensing and/or digital rights management for an application module may be performed to prevent third parties from working around the code to illegitimately use and/or distribute the application module. A developer may add some protective measures directly while source coding the application, however, this may be quite burdensome and time consuming for the developer. Another approach involves applying protection to compiled binary files after the files are output by the compiler. However, obfuscating already compiled binaries can make some binaries unstable, limits the types of obfuscation and code optimizations available, and adds complexity and time to the development process. Moreover, some techniques used for traditional obfuscation are fairly straightforward to detect at runtime or through static analysis of binaries on disk, particularly by sophisticated hackers. These and other complexities of traditional obfuscation techniques act as barriers that may make it inefficient or prohibitive for developers to add effective protection to their code.

SUMMARY

Compiler based obfuscation is described. To protect portions of a code project with obfuscations, the code is modified within a compiler to produce one or more modifications that obfuscate the code as part of a compilation process. A compiled version of the code is generated having the modifications that are produced within the compiler. In one approach, the compiler is configured to consume an obfuscation description that indicates portions of the code to protect and specifies the modifications to make to the indicated portions. Various different modifications of code may be performed during the compilation process to implement corresponding obfuscation features. For example, the modifications made within a compiler may include, but are not limited to, modifications designed to enable tamper detection, anti-debugging, and/or encryption of the code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

It may be difficult or prohibitive for developers to add effective protection to their code to prevent third parties from illegitimately using or distributing the code using traditional obfuscation techniques. Traditional obfuscation techniques applied either during source coding or to compiled binaries output by a compiler may provide limited protection options, use techniques that are fairly straightforward to detect at runtime, and/or add time/complexity/cost to the development process.

Compiler based obfuscation is described herein. To protect portions of a code project with obfuscations, the code is modified within a compiler to produce one or more modifications that obfuscate the code as part of a compilation process. A compiled version of the code is generated having the modifications that are produced within the compiler. In one approach, the compiler is configured to consume an obfuscation description that indicates portions of the code to protect and specifies the modifications to make to the indicated portions. Various different modifications of code may be performed during the compilation process to implement corresponding obfuscation features. For example, the modifications made within a compiler may include, but are not limited to, modifications designed to enable encryption, anti-debugging, and/or tamper detection of the code.

In the following discussion, an example environment is first described that may employ the compiler based obfuscation techniques described herein. Next, an example process flow scenario is described that illustrates example details of compiler based obfuscation. Example procedures are then described which may be performed in the example environment as well as other environments. Consequently, performance of the example procedures is not limited to the example environment and the example environment is not limited to performance of the example procedures. Lastly, an example system and components of the system are described that can be employed in one or more implementations of compiler based obfuscation.

Example Operating Environment

Figure 1:
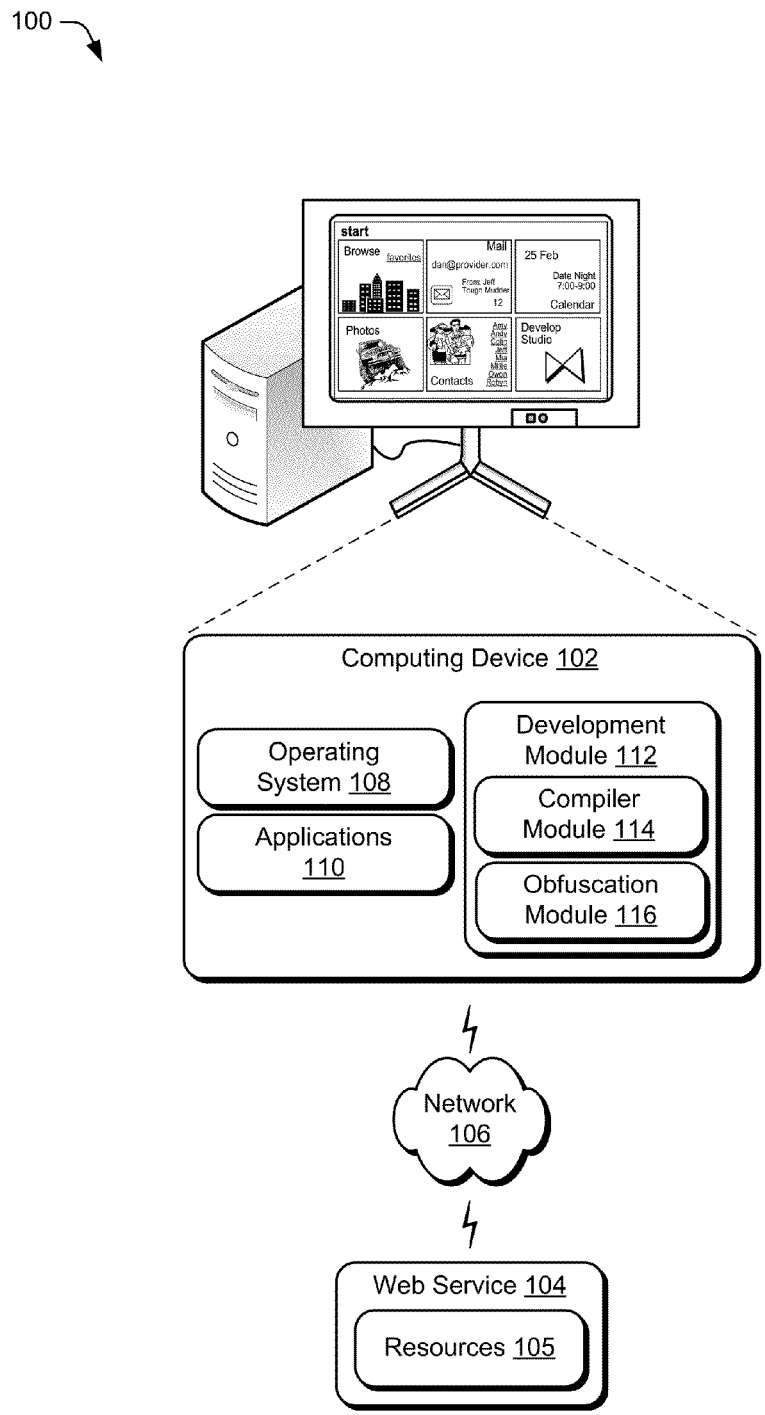
FIG. 1 is an illustration of an environment in an example implementation that is operable to employ compiler based obfuscation techniques.

FIG. 1 is an illustration of an environment 100 in an example implementation that is operable to employ techniques described herein. The illustrated environment 100 includes a computing device 102 and a web service 104 that are communicatively coupled via a network 106. The computing device 102 may be configured to access and interact with a variety of resources 105 (e.g., content and services) made available via the web service 104 over the network 106. The computing device 102 and the web service 104 may each be implemented by a wide range of computing devices.

For example, a computing device 102 may be configured as a computer that is capable of communicating over the network 106, such as a desktop computer, a mobile station, an entertainment appliance, a tablet or slate device, a surface computing device, a set-top box communicatively coupled to a display device, a mobile communication device (e.g., a wireless phone), a game console, and so forth. The computing device 102 may be configured as any suitable computing system and/or device that employ various processing systems, some additional examples of which are discussed in relation to the example system of FIG. 6.

The computing device 102 is further illustrated as including an operating system 108. Generally speaking, the operating system 108 is configured to abstract underlying functionality of the computing device 102 to applications 110 that are executable on the computing device 102. For example, the operating system 108 may abstract processing, memory, network, and/or display functionality of the computing device 102 such that the applications 110 may be written without knowing "how" this underlying functionality is implemented. The application 110, for instance, may provide data to the operating system 108 to be rendered and displayed by the display device without understanding how this rendering will be performed. The operating system 108 may provide various services, interfaces, and functionality that applications 110 may invoke to take advantage of system features. A variety of applications 110 to provide a wide range of functionality to the computing device 102 are contemplated including but not limited to a browser, an office productivity application, an email client, a multi-media management program, device management software, a software development environment, and networking applications, to name a few examples.

The computing device 102 also includes a development module 112 that represents functionality operable to provide an integrated development environment (IDE) for development of applications 110. The development module 112 generally provides application lifecycle management including support for design, development, testing, and/or deployment of applications. The development module 112 may support different programming languages and integrate different components to simplify application development such as a code editor, one or more compilers, build automation tools, a debugger, and so forth. Thus, the development module 112 provides functionality for a developer to create/edit source content/code for a project and compile the source content/code to build an application 110.

In accordance with techniques described herein, the development module 112 may further include or otherwise make use of a compiler module 114 and an obfuscation module 116 that operate as described herein. The compiler module 114 represents functionality operable to implement a compilation process to transform source code files for a development project into machine language code and executables (e.g., object code, binary files, executable files, etc.). The compiler module 114 may include multiple distinct sub-modules, processing steps, and/or compiling stages. For example, the compiler module may include both a front-end compiler and a back-end compiler. Although illustrated as a stand-alone module, the obfuscation module 116 may also be provided as an integrated component of the compiler module 114. Moreover, in some implementations one or more of the development module 112, compiler module 114, and/or obfuscation module 116 may be configured as web services that are made accessible to clients over the network 106 (e.g., as a development service or obfuscation service "in the cloud"). In this example, developers may be able to develop applications through interaction with a web service 104 that provides application development tools including code obfuscation tools/interfaces as resources 105 available online.

The obfuscation module 116 represents functionality operable to enable code obfuscation techniques as part of compilation processes performed by the compiler module 114. Generally speaking, obfuscation as used herein refers to modifying code in different ways to make it difficult to understand. Obfuscation may be employed to hide the meaning and purpose of code even if the code is intercepted and viewed in the clear. This creates a level of protection against "hackers" who may attempt to tamper with or reverse engineer code. In contrast to traditional techniques, the obfuscation occurs during the compilation process. The compiler module 114 may therefore be configured to invoke, interact with or otherwise make use of the obfuscation module 116 during compilation to apply modifications to obfuscate at least some portions of source code. In at least some implementations, a developer may interact with the development module 112 and/or obfuscation module 116 to produce an obfuscation description to specify particular portions of the source code to protect with obfuscation as well as to define modifications for the portions. The obfuscation description may be configured with instructions that are suitable to direct the compiler module 114 to implement the modifications for the specified portions of source code during compilation. Various different kinds of modifications and techniques to obfuscate code are contemplated, examples of which are described in relation to the following figures.

Having considered an example operating environment, consider now some example details for compiler based obfuscation in accordance with one or more embodiments.

Compiler Based Obfuscation Details

Figure 2:
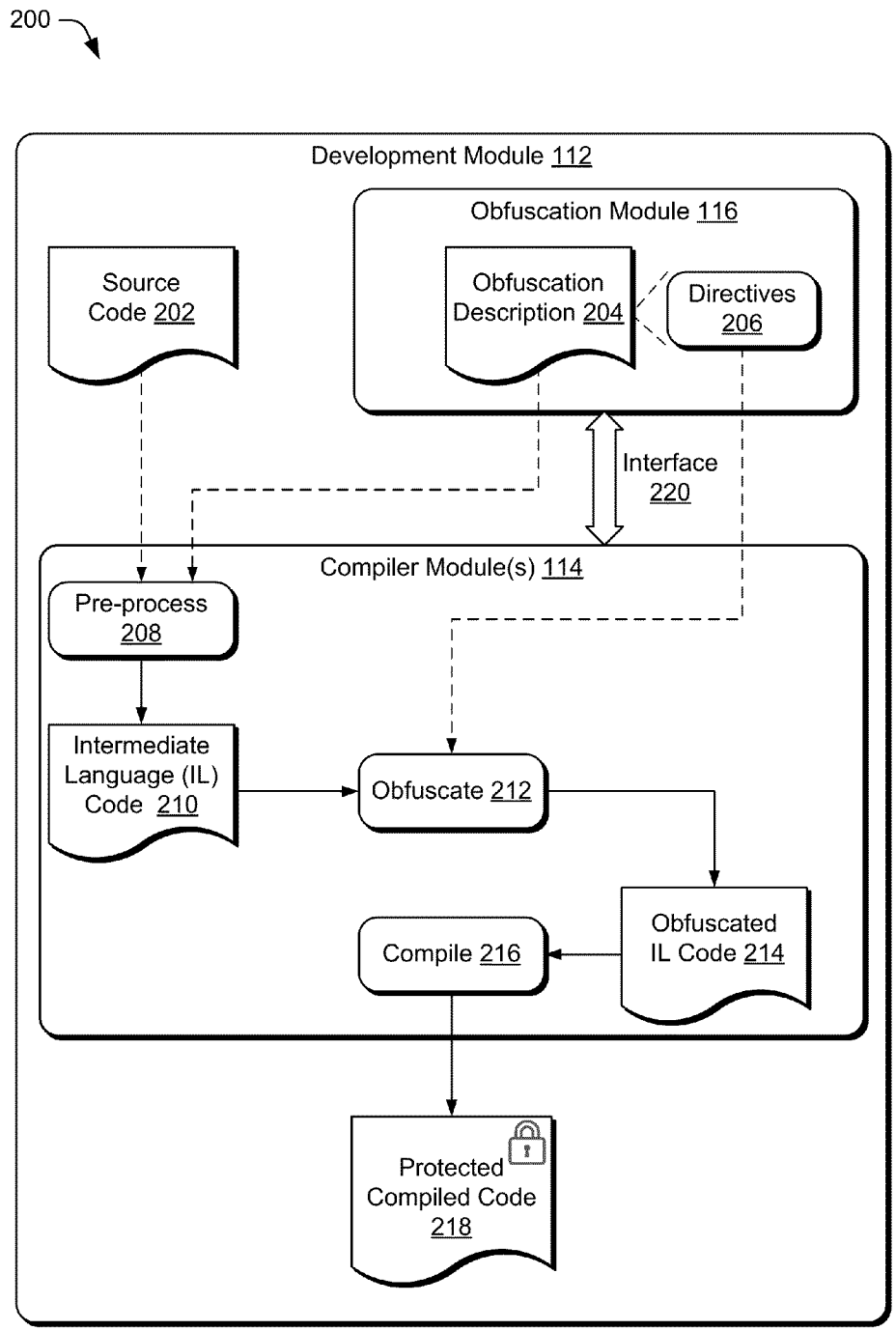
FIG. 2 is a diagram depicting an example compiler based obfuscation that represents operations that may occur to produce compiled code protected with obfuscation.

The following discussion describes implementation details of compiler based obfuscation techniques that may be implemented utilizing the previously described systems and devices. Aspects of compiler based obfuscation are described with reference to an example scenario depicted in FIG. 2. In particular, FIG. 2 depicts generally at 200 details regarding components and operation of a development module 112 that may be employed to produce protected compiled code by obfuscating code during compilation in accordance with some implementations.

In operation, a developer may use the development module 112 to design, define, create and edit source code 202 (e.g., code modules, content, script, images, styles, annotations, etc.) in a project for an application. The development module 112 may support software programming in one or multiple different programming languages. In general, the compiler based obfuscation techniques described herein may be employed with various different programming languages, IDEs, compilers and so forth.

As part of the development project, the obfuscation module 116 may be invoked to produce an obfuscation description 204 that is associated with the source code 202. In one approach, an interface may be exposed that enables a developer to make selections to produce an obfuscation description 204 for portions of source code 202. As noted, the obfuscation description 204 is configured to specify at least some portions of the source code 202 to obfuscate and define modifications to make for those portions. In one approach, the obfuscation description 204 may contain various directives 206 that may be consumed by the compiler module 114 to implement corresponding obfuscations. The obfuscation module 116 may be configured to automatically generate directives 206 in response to selections made by the developer through a suitable interface.

The directives 206 may be configured in various ways to identify portions of the source code 202 that are selected by the developer for protection. The directives 206 may be further configured to define different types of modifications, obfuscation algorithms, settings, and other parameters that can be interpreted and applied during compilation to effectuate the modifications. In some implementations, the directives 206 are created to include portions of source code for implementing one or more modifications specified for selected portions of the source code 202. The modifications in general are designed to manipulate code to obfuscate the code in some manner. This may include but is not limited to distortions of the code, symbol/syntax substitutions, re-ordering of blocks or modules, insertions into the code, branches, function rearrangements, addition of jump instructions, layout and program flow manipulations, encryption of sensitive code portions, and so forth.

Modifications may also include virtualization of one or more functions to run in an obfuscated form at runtime. Here, a virtual execution environment is defined for at least one function that interprets commands/instructions represented in a modified, obfuscated form. The modified, obfuscated representation of the instructions may be byte code values that are difficult for a hacker to interpret even if intercepted in the clear. At runtime, the virtual execution environment in effect simulates or emulates the operation of the instructions that are represented in the modified, obfuscated form. In this way, exposure of the underlying instructions that are represented can be avoided.

The compiler module 114 may be configured to perform operations including scanning source code 202, parsing the code, verifying syntax, translating the source code into intermediate language (IL) code, optimizing the code and layout, and producing compiled output files (e.g., binary files, assembly code, object code, etc.). As part of this process, the compiler module 114 may apply selected obfuscation algorithms specified by the directives 206 to implement corresponding modifications. Any suitable algorithms to produce appropriate modifications of the code for obfuscation of the code may be employed. At least some portions of code may be selected for obfuscation by way of the directives 206, while other portions of the code may remain un-obfuscated/un-modified. One or more different algorithms may be applied to each portion of code that is selected for obfuscation. In one approach, different algorithms or variations of the algorithms to implement obfuscations are generated on the fly (e.g., dynamically on demand) as part of the compilation process. Thus, different techniques and algorithms may be employed to obfuscate different portions of the code. Using different algorithms for different code portions further complicates attempts to reverse engineer the code since a hacker/malicious party may be unable to fully understand the purpose and/or meaning of code without discovering and decoding each individual technique and algorithm used for each obfuscated code portion.

Further, the obfuscation can be individualized for each portion. For example, encryption may be applied to some sensitive digital rights code portions whereas code rearrangement and layout modification may be used for less sensitive code to provide different respective levels of protection. Jump instructions and symbol substitutions may be selectively applied to additional protected portions. Further different key pairs and/or substitution patterns for encoding/decoding obfuscations may be generated dynamically for different protected portions. The different key pairs and/or substitution patterns may be employed to vary the algorithmic scheme and/or individualize obfuscation algorithms for different protected portions as well as across different projects/applications. The encoding/decoding keys may be randomly generated keys, keys derived based on a checksum or hash, static key values, and so forth. Other portions of the code may remain unmodified and unprotected by obfuscation.

Thus, appropriate levels of protection may be selected for each code portion and corresponding techniques/algorithms that vary one to another may be applied to the portions on an individual basis. The particular obfuscation scheme used for each project and the techniques applied in each instance may vary to make it difficult to determine the type of protection used for any given portion of the code. In this manner, different obfuscation features and modifications may be applied on an individual basis to multiple portions of protected code to individualize the protection as directed by the obfuscations definition 204 and/or directives 206.

Thus, the obfuscation module 116 may be invoked to produce directives 206 that define obfuscations to occur in the compiler. For example, the developer thorough the obfuscation module 116 may select at least some code portions to protect, such as code portions that relate to digital licensing and rights management. This action produces the obfuscation description 204 that includes the directives 206 for consumption by the compiler. The source code 202 for a project and the corresponding obfuscation description 204 with directives 206 may then be supplied as input to the compiler module 114 as represented in FIG. 2.

Generally speaking, the compiler module 114 represents functionality operable under the influence of the obfuscation module 116 to parse and translate source code 202 for a development project into a compiled and protected (e.g., obfuscated) version of the code. As noted previously, the compiler module 114 may include multiple distinct sub-modules, processing steps, and/or compiling stages. For example, the compiler module may include both a front-end compiler and a back-end compiler, or other divisions of the functionality.

As represented in FIG. 2, the compiler module 114 may perform a pre-process operation 208 to parse source code 202 and transform the source code 202 into intermediate language code 210 (e.g., IL code). The IL code is representative of high level instructions generated based on pre-processing of the source code. The high level instructions of the IL code may be consumed later in the compilation process to produce lower level machine code. The IL code may also incorporate runtime instructions derived from the obfuscation description 204 to enable obfuscation functionality. Thus, the intermediate language code 210 may represent a combination of the source code 202 with code portions indicated by the obfuscation description 204 to implement various modifications in the compilation process.

By way of example and not limitation, the pre-process operation 208 may employ a tokenizer or comparable functionality to derive runtime instructions from the obfuscation description 204. Here, the tokenizer may parse and interpret the obfuscation description 204 to produce a runtime file having directives 206 in a format suitable to be expanded into an intermediate language. The tokenizer may also produce tokens that describe the configuration for various modifications to be applied during compilation. The tokens may be implemented as key value pairs of strings that represent configuration data for modifications in accordance with a schema defined for compiler-based obfuscations. Then, the directives may be expanded and the tokens replaced with corresponding intermediate language code to produce a pre-processed runtime file that contains source obfuscation code for functions, data structures, and algorithms to be incorporated in the compiled code to implement obfuscation.

Further, the pre-process operation 208 may further employ a front-end compiler or comparable functionality to combine the source code 202 for the project with the source obfuscation code and pre-compile the combined code into the intermediate language code 210. In other words, the obfuscation description 204 and/or associated directives 206 may be used in the pre-process operation 208 to produce source obfuscation code indicative of modifications to make to the source code. Then, source code for the project and the source obfuscation code are hooked together in a pre-compile stage that may be performed via a front-end compiler or otherwise. The result of the pre-process operation 208 is the intermediate language code 210 that combines the source code 202 and configuration information for obfuscations.

The intermediate language code 210 may then be consumed in subsequent stages of the compilation process implemented by the compiler module 114. As further shown in FIG. 2, this may include an obfuscate process 212 the takes the intermediate language code 210 as input and modifies the code accordingly to produce obfuscated intermediate language code 214. Thus, the obfuscation occurs within the compiler as opposed to traditional techniques that operate upon already compiled versions of code or require the developer to perform time/resource intensive modifications during source code development.

Then, the obfuscated intermediate language code 214 is compiled in a compile process 216 to produce the protected compiled code 218 having the various modifications to obfuscate the code. In general, the compile process 216 involves converting the code into lower level machine code such as binaries, object code, assembly code, and so forth. Thus, the compile process 216 as used herein refers to operations to transform the IL code to appropriate lower level machine code. The obfuscate process 212 and compile process 216 may occur by way of a back-end compiler or other comparable functionality implemented by the compiler module 114. Moreover, obfuscation and compiling of the intermediate language code may occur sequentially (as shown), concurrently for different protected portions, or otherwise.

In one approach, the input intermediate language code 210 is converted into tuple streams which are operated upon by the compiler module 114 (e.g., back-end compiler) and obfuscation module 116. Here the compiler module 114 may interact with the obfuscation module 116 in various ways to implement the modifications as specified by the obfuscation description 204 and reflected in the intermediate language code 210. The interaction may occur by way of a suitable interface 220 that facilities communications, data exchanges, and other interactions between the compiler module 114 and the obfuscation module 116

In an embodiment, the compiler module 114 is configured to invoke the obfuscation module 116 during compilation to pass configuration information regarding symbols, data types, states, and phases of functions to the obfuscation module 116 as the IL code is being processed. The obfuscation module 116 may make use of the information obtained from the compiler module 114 to determine functions and data to protect and to ascertain the types of obfuscations and modification to make. Here, the obfuscation module 116 may be implemented as a component that is separate from the compiler module 114 and therefore may be unable to directly make the specified modifications. Instead, the obfuscation module 116 processes the configuration information supplied by the compiler module 114, recognizes modifications that are indicated by the configuration information, and sends instructions for receipt by the compiler module that are configured to cause the compiler module to make the modifications on its behalf For example, the obfuscation module 116 may direct the compiler module 114 to insert calls, get or set certain values, encrypt a function, and/or make other kinds of modifications to obfuscate the code, examples of which are described above and below. In addition or alternatively, the obfuscation module 116 may be implemented as a component of the compiler module 114 and/or a back-end compiler and therefore may operate to make modifications directly to the IL code.

A variety of different kinds of modifications are contemplated as noted previously. The modifications are used to implement obfuscation features/functionality such as tamper detection, anti-debugging, and/or encryption. In an implementation, the modifications are designed to enable one or more of heap execution at runtime, encryption/decryption of code portions, and verification of the code. Some non-limiting examples of modifications that may be employed to implement these and other compiler-based obfuscation features include changes to symbol attributes and behaviors, creation of clone functions, call redirections, segmenting of code blocks, rearranging of code blocks, replacing calls, setting absolute references between particular code segments, and modification of entry points. One or more of the example modifications in the forgoing list may be made to enable heap execution as well as other obfuscation features. Modifications may also include insertion of checksums, verifier modules, and/or other verification code to implement verification features as well as to facilitate other obfuscation features. Additionally, the modifications may include encryption of code portions and/or addition of decryption/re-encryption code to implement encryption for designated portions of the code. Additional details regarding these and other aspects of techniques for compiler based code obfuscation can be found in the following discussion of example procedures.

Example Procedures

In this section, example procedure(s) for compiler based obfuscation are discussed that can be implemented in connection with any suitable hardware, software, firmware, or combination thereof The procedures are shown as a set of blocks that specify operations performed by one or more devices and are not necessarily limited to the orders shown for performing the operations by the respective blocks. In at least some embodiments, the procedures may be implemented by way of a suitability configured computing device, such as the example computing device 102 of FIG. 1. Aspects of the procedures may be implemented by way of a development module 112 of a computing device. Further, the development module may include or make use of an obfuscation module 116 and/or compiler module 114 configured to perform at least some of the operations that are described in relation to the example procedures.

Figure 3:
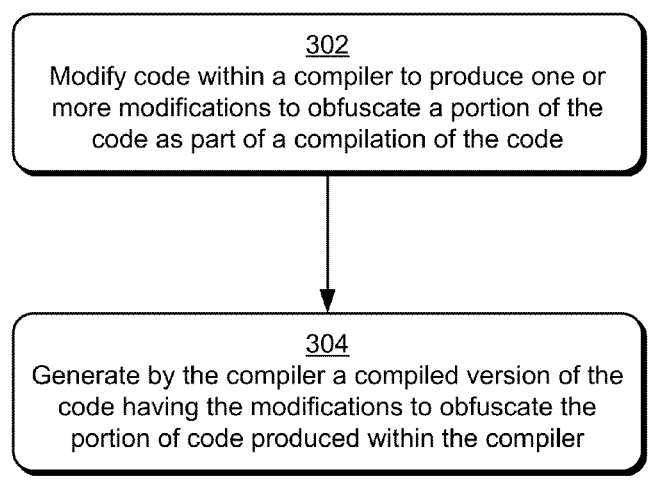
FIG. 3 is a flow diagram depicting a procedure in an example implementation in which compiled code protected with obfuscation is produced as part of compiling code for a development project.

FIG. 3 depicts a procedure 300 in an example implementation in which compiled code protected with obfuscation is produced as part of compiling code for a development project. By way of example and not limitation, the procedure 300 may represent example operations performed via one or more compiler modules 114 of a development module 112. Code is modified within a compiler to produce one or more modifications to obfuscate a portion of the code as part of compilation of the code (block 302). For instance, a compiler (e.g., compiler module 114) of a development module 112 may be invoked to compile an application development project. As described in relation to FIG. 2, the compiler may include or interact with an obfuscation module 116 that supplies an obfuscation description 204 having directives 206 that describe how to obfuscate associated source code. The directives 206 are configured to cause the compiler to implement various modifications as part of compiling the source code. The compiler may operate in conjunction with the obfuscation module to make specified modifications to at least some portions of code in the project. A variety of modifications are contemplated as described previously. The modifications are employed to produce different types of obfuscation features supported by the development module including but are not limited to encryption, verification, and heap execution of code.

A compiled version of the code is generated by the compiler having the modifications to obfuscate the portion of code produced within the compiler (block 304). For instance, code that is obfuscated by way of the various different modifications may be compiled by the compiler to produce compiled code. The compiled code may be binary files or other low level files in an appropriate machine language. The compiled code that is output by the compiler contains the obfuscations that are implemented within the compiler itself.

Figure 4:
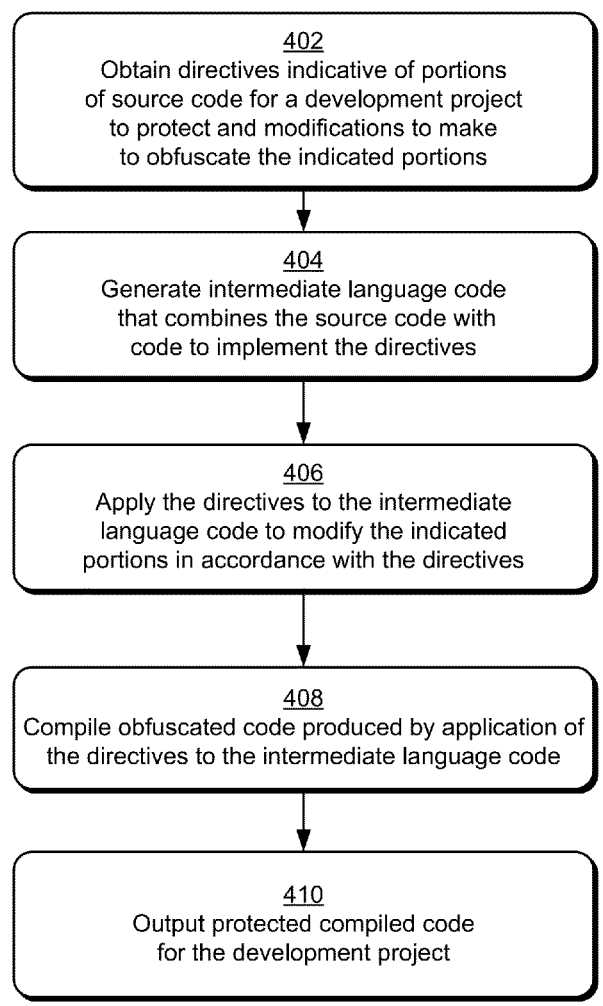
FIG. 4 is a flow diagram depicting a procedure in an example implementation in which modifications are made to intermediate language code to produce obfuscated code as part of a compilation process.

FIG. 4 is a flow diagram depicting a procedure 400 in an example implementation in which modifications are made to intermediate language code to produce obfuscated code. By way of example and not limitation, the procedure 400 may represent example operations performed via a compiler module 114 that includes or makes use of an obfuscation module 116. Directives are obtained that are indicative of portions of source code for a development project to protect and modifications to make to obfuscate the indicated portions (block 402). For example, directives 206 contained in an obfuscation description 204 may be supplied by an obfuscation module 116 for use by a compiler module 114 during compilation of associated source code. The directives 206 may specify different modifications to make and indicate particular portions of code to protect as previously described.

Intermediate language code is generated that combines the source code with code to implement the directives (block 404). This may occur in the manner described in relation to FIG. 2. For instance, pre-processing may occur to produce obfuscation source code. The obfuscation source code is combined with source code for the project and pre-compiled into an intermediate language format. In one approach, a single object file having the combined IL code is output for handling in subsequent stages of the compilation process.

The directives are applied to the intermediate language code to modify the indicated portions in accordance with the directives (block 406). Then, the obfuscated code produced by application of the directives to the intermediate language code is compiled (block 408) and protected compiled code for the development project is output (block 410). Here, the compiler module 114 may operate to process the combined IL code to put into effect the various modifications that are specified. To do so, the compiler may invoke and/or otherwise interact with the obfuscation module 116 as discussed previously. The compiler module 114 may be further configured to compile the code to lower the IL code into lower level machine code (e.g., binaries). Generally, this may include parsing the code, recognition and verification of syntax, symbol substitution, layout and optimization of the code, and other operations typically performed to compile source code. The result is a compiled version of the code that is protected by various obfuscations from reverse engineering and manipulation by third parties.

Figure 5:
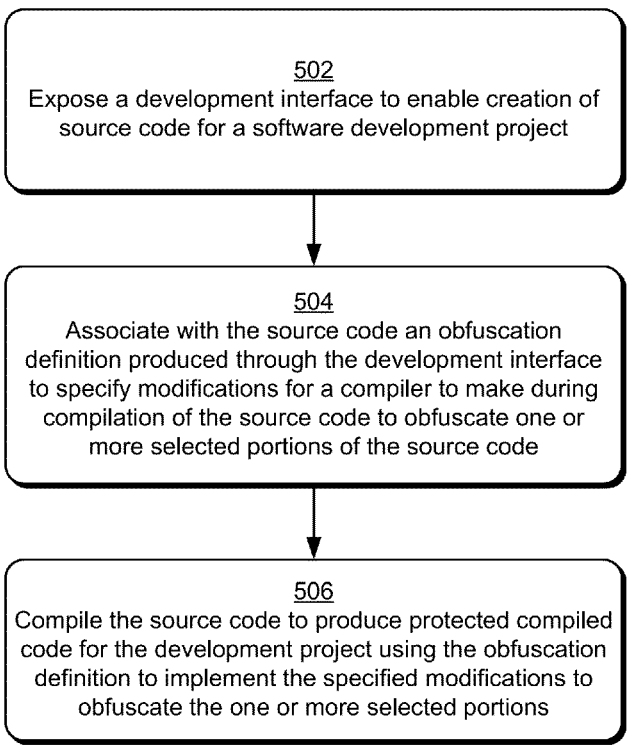
FIG. 5 is a flow diagram depicting a procedure in an example implementation in which compiler based obfuscation is performed via an integrated development environment.

FIG. 5 is a flow diagram depicting a procedure 500 in an example implementation in which compiler based obfuscation is performed via an integrated development environment. By way of example and not limitation, the procedure 500 may represent example operations performed via a development module 112 that represents an integrated development environment (IDE) available as a desktop package, an online web service, or otherwise. A development interface is exposed to enable creation of source code for a software development project (block 502). For instance, a development module 112 may be employed by a developer to produce source code for an application or other project. The development module 112 may include or make use of an obfuscation module 116 that operates as described herein to implement compiler-based obfuscation.

The source code is associated with an obfuscation description produced through the development interface to specify modifications for a compiler to make during compilation of the source code to obfuscate one or more selected portions of the source code (block 504). Here, the obfuscation module 116 may be invoked to produce an obfuscation description 204 that includes directives 206 indicative of modifications specified for one or more portions of the code. Various modifications may be specified selectively for portions of the code on an individual basis.

The source code is compiled to produce protected compiled code for the development project using the obfuscation description to implement the specified modifications to obfuscate the one or more selected portions (block 506). For example, the compiler module 114 may obtain and interpret the obfuscation description 204 to implement corresponding modifications of the code during compilation. The compiler module 114 may implement the modifications directly or may rely upon the obfuscation module 116 to direct the modifications as discussed herein. A variety of modifications as discussed above may be made to generate compiled code that is protected with one or more types of obfuscations that make it difficult for third parties to understand, interpret, and reverse engineer the resultant code.

Having considered example procedures for compiler based obfuscation, consider now a discussion of an example system and components that can be employed to implement embodiments of the techniques described herein.

Example System

Figure 6:
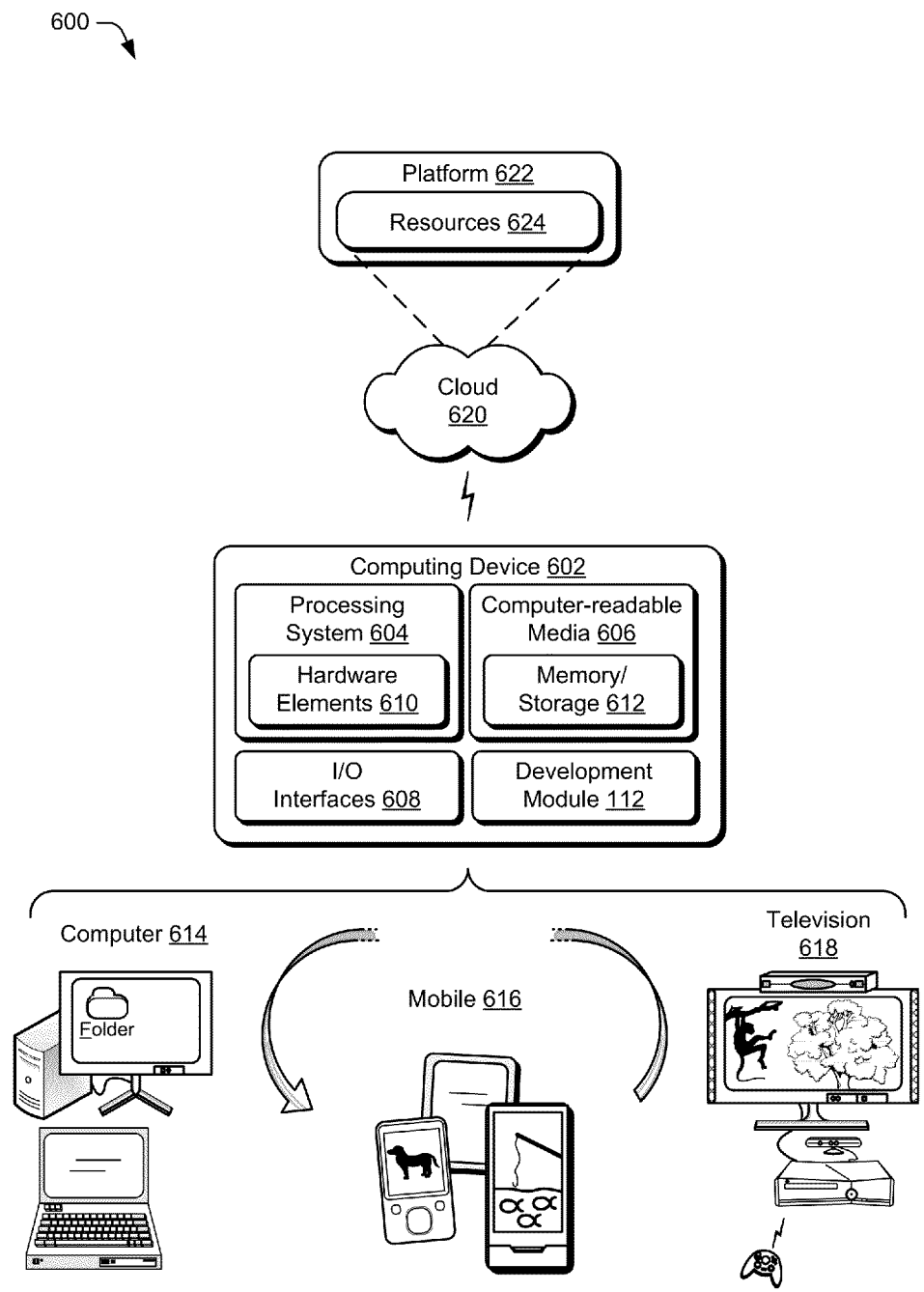
FIG. 6 illustrates an example system and components of the system that can be employed to implement embodiments of the techniques described herein.

FIG. 6 illustrates an example system 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" refers to signal-bearing media configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 108, applications 110, development module 112, compiler module 114, obfuscation module 116, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the development module 112 on the computing device 602. The functionality of the development module 112 and other modules may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   modifying code for a development project within a compiler to produce one or more modifications to obfuscate a portion of the code as part of compilation of the code, including:
   obtaining an obfuscation description having directives that define the modifications, the modifications designed to enable one or more of: heap execution verification, or encryption of the code; and
   producing the modifications by applying the obfuscation description to intermediate code that combines the code for the development project with code to implement the directives, the obfuscation description configured to designate portions of the code to obfuscate and modifications to make to the one or more portions; and
   generating by the compiler a compiled version of the code having the modifications produced within the compiler to obfuscate the portion of code.

2. The method as recited in claim 1, further comprising generating one or more obfuscation algorithms on the fly as part of the compilation process to produce the modifications.

3. The method as recited in claim 2, wherein different obfuscation algorithms are generated for and applied to at least two different portions of the code.

4. The method as recited in claim 1, further comprising:
   modifying multiple portions of the code as part of compilation of the code including applying different obfuscation features and modifications on an individual basis to the multiple portions as directed by the directives in the obfuscation description to individualize protection of the multiple portions.

5. The method as recited in claim 1, wherein generating the compiled version of the code comprises producing compiled binary files.

6. The method as recited in claim 1, wherein the modifications comprise at least one of rearranging of code blocks, call redirection, creation of a clone function, changes to symbol attributes and behaviors, segmenting of code blocks, replacing calls, setting absolute references between different portions of the code, or modification of entry points into the code.

7. The method as recited in claim 1, wherein the modifications comprise at least one of insertion of checksums, verifier modules, or verification code.

8. The method as recited in claim 1, wherein the modifications comprise encryption of the portion of code and addition of decryption/re-encryption code.

9. The method as recited in claim 1, wherein the modifications comprise virtualization of at least one function to run in an obfuscated form at runtime.

10. The method as recited in claim 1, wherein the modifying comprises:
    pre-processing the code to produce intermediate language code that combines source code for the development project with source obfuscation code indicative of the modifications to make to the source code; and obfuscating the code by applying the modifications to the intermediate language code within the compiler during compilation of the code.

11. One or more computer-readable storage media storing instructions that, when executed by a computing device, implement a compiler module configured to perform operations comprising:
   obtaining directives indicative of portions of source code for a development project to protect and modifications to make to obfuscate the indicated portions, the modifications designed to enable one or more of heap execution, verification, or encryption of the source code;
   generating intermediate language code that combines the source code with code to implement the directives; and
   applying the directives to the intermediate language code to modify the indicated portions in accordance with the directives during compilation of the intermediate language code by the compiler module including modification of one or more functions to execute in an obfuscated form at runtime via a virtual execution environment that emulates operation of obfuscated instructions for the one or more functions.

12. One or more computer-readable storage media as described in claim 11, wherein applying the directives to the intermediate language code further comprises:
   passing configuration information to an obfuscation module during compilation of the intermediate language code; and
   receiving instructions from the obfuscation module configured to cause the compiler module to make the modifications.

13. One or more computer-readable storage media as described in claim 11, wherein the compiler module is further configured to perform operations comprising:
   compiling obfuscated code produced by application of the directives to the intermediate language code; and
   outputting protected compiled code for the development project having obfuscations produced during the compilation of the intermediate language code by the compiler module.

14. A computing device comprising:
   a processing system;
   one or more modules operable at least in part via hardware of the processing system to implement an integrated development environment (IDE) including:
   a development module to expose a development interface to enable creation of source code for a software development project;
   an obfuscation module to:
   produce an obfuscation description produced through the development interface to specify modifications for a compiler to make during compilation of the source code to obfuscate one or more selected portions of the source code including applying different obfuscation features and modifications on an individual basis to the selected portions as directed by the obfuscation description to individualize protection of the selected portions;
   associate the obfuscation description with the source code; and
   supply the obfuscation description for consumption by the compiler module; and
   a compiler module to compile the source code to produce protected compiled code for the development project using the obfuscation description to implement the specified modifications to obfuscate the one or more selected portions during compilation by interpreting and applying the obfuscation description supplied by the obfuscation module.

15. The computing device of claim 14, wherein the obfuscation module and the compiler module are implemented as integrated components of the integrated development environment (IDE).

16. The computing device of claim 14, wherein the integrated development environment (IDE) is configured as a web accessible service available to developers over a network.

* * * * *